(12) United States Patent
Hara (10) Patent No.: US 7,872,679 B2
(45) Date of Patent: Jan. 18, 2011

(54) IMAGE PICKUP APPARATUS, DEFECT COMPENSATION DEVICE, AND DEFECT-COMPENSATING METHOD

(75) Inventor: Manabu Hara, Kanagawa (JP)

(73) Assignee: Sony Corporation (JP)

( * ) Notice: Subject to any disclaimer, the term of this patent is extended or adjusted under 35 U.S.C. 154(b) by 683 days.

(21) Appl. No.: 11/891,872

(22) Filed: Aug. 13, 2007

(65) Prior Publication Data

US 2008/0036883 A1 Feb. 14, 2008

(30) Foreign Application Priority Data

Aug. 14, 2006 (JP) .......................... P2006-221226

(51) Int. Cl.
*H04N 9/64* (2006.01)

(52) U.S. Cl. ..................................... 348/247

(58) Field of Classification Search ................. 348/241, 348/243–247

See application file for complete search history.

(56) References Cited

U.S. PATENT DOCUMENTS

| | | | | |
|---|---|---|---|---|
| 6,970,194 | B1 * | 11/2005 | Smith ........................... | 348/247 |
| 7,405,756 | B2 * | 7/2008 | Itoh ............................. | 348/246 |
| 7,656,443 | B2 * | 2/2010 | Ikeda .......................... | 348/246 |
| 2004/0051797 | A1 * | 3/2004 | Kelly et al. ................. | 348/244 |
| 2006/0012695 | A1 * | 1/2006 | Chang et al. ................ | 348/246 |

FOREIGN PATENT DOCUMENTS

| | | | |
|---|---|---|---|
| EP | 1130907 | A2 | 9/2001 |
| JP | 6-070238 | A | 3/1994 |
| JP | 06-113211 | A | 4/1994 |
| JP | 6-303531 | A | 10/1994 |
| JP | 6-350926 | A | 12/1994 |
| JP | 7-236093 | A | 9/1995 |
| JP | 8-251484 | A | 9/1996 |
| JP | 2000-209506 | A | 7/2000 |
| JP | 2000209506 | A * | 7/2000 |
| JP | 3104098 | B2 | 9/2000 |
| JP | 2005-006196 | A | 1/2005 |

OTHER PUBLICATIONS

International Search Report issued on Jul. 21, 2010 in connection with corresponding European Appln. No. EP 07 253 162.7.

* cited by examiner

*Primary Examiner*—Timothy J Henn
(74) *Attorney, Agent, or Firm*—Lerner, David, Littenberg, Krumholz & Mentlik, LLP (57) ABSTRACT

An image pickup apparatus has an image pickup device, a defect-information-storing unit that stores defect information relative to a defective pixel in the image pickup element, a compensation-signal-generating unit that generates a compensation signal for each defective pixel, first and second compensation units that compensate for the pixel signal relative to the defective pixel indicated by the defect information with and without applying the compensation signal to the pixel signal, and a compensation-switching unit that switches between a first signal compensated by the first compensation unit and a second signal compensated by the second compensation unit based on a comparison result of a signal level of the compensation signal with a signal level of a predetermined compensation-switching reference signal.

9 Claims, 5 Drawing Sheets

IMAGE PICKUP APPARATUS, DEFECT COMPENSATION DEVICE, AND DEFECT-COMPENSATING METHOD

CROSS-REFERENCE TO RELATED APPLICATIONS

The present application claims priority from Japanese Patent Application No. JP 2006-221226, filed in the Japanese Patent Office on Aug. 14, 2006, the entire content of which is incorporated herein by reference.

BACKGROUND OF THE INVENTION

1. Field of the Invention

The present invention relates to an image pickup apparatus, and a defect compensation device and a defect-compensating method, which are used in the image pickup apparatus.

2. Description of Related Art

In image pickup elements such as a charge coupled devices (CCD) image sensor or a complementary metal-oxide semiconductor (CMOS) image sensor, a plurality of pixels each for performing photoelectric conversion is provided. An image signal is generated based on a pixel signal that is generated by each of the pixels. In such the image pickup elements, there may be a defective pixel (hereinafter, referred to as "first defective pixel") in which the pixel signal generated for each pixel results in a greater amount of offset than a level that has been previously set because of lack of uniformity on the element's characteristic. Further, there may be another defective pixel (hereinafter, referred to as "second defective pixel") in which the pixel signal generated for each pixel results in a signal having a level that is independent on an incident beam because of a lattice defect thereof and the like. Accordingly, in an image pickup apparatus equipped with such the image pickup element, in order to prevent any picture quality from being made poor by these defective pixels, any defect compensation to compensate for a pixel signal corresponding to each of these defective pixels is performed in the image signal so that these defective pixels can be very little visible in an image.

Figure 1:
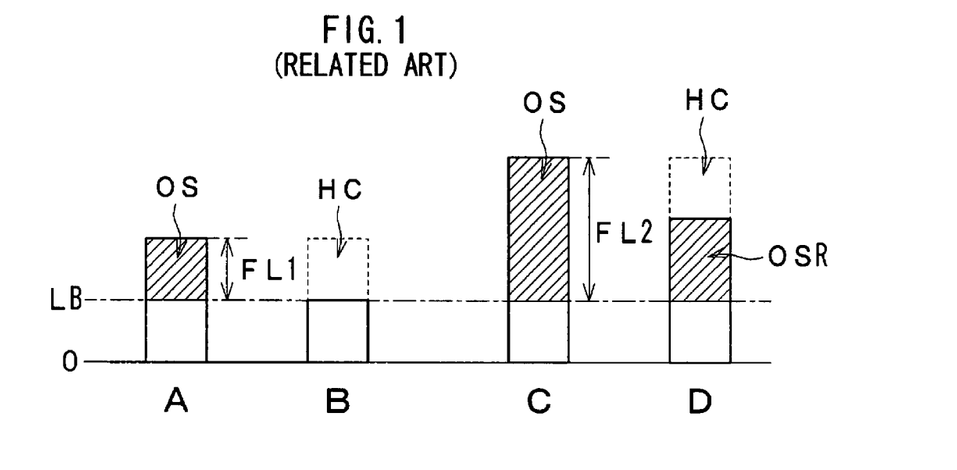
FIG. 1 is a diagram for illustrating an operation for a defect compensation relative to related art.
Figure 2:
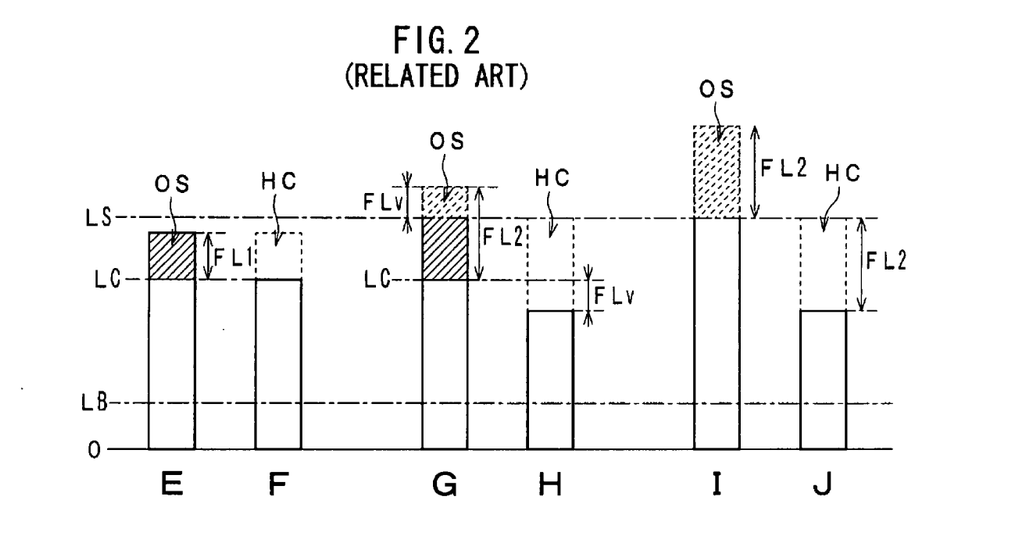
FIG. 2 is a diagram for illustrating an over-compensation in the defect compensation operation.

In a case of the defect compensation of the pixel signal relative to the first defective pixel, an amount of the offset of the pixel signal relative to the first defective pixel is deleted from the pixel signal by using the compensation signal corresponding to the offset of the pixel signal relative to the first defective pixel. For example, if the pixel signal relative to the first defective pixel results in an offset OS of the pixel signal A (illustrated by oblique lines in FIG. 1) generated by the image pickup element, the offset OS can be deleted from the pixel signal A by subtracting a compensation signal HC having a same level as an amount of offset FL1 of the offset OS from the pixel signal A so that a pixel signal B shown in FIG. 1 can be generated. If, however, the offset OS of the pixel signal relative to the first defective pixel increases from the amount of offset FL1 to an amount of offset FL2 as a pixel signal C shown in FIG. 1 based on any fluctuation in temperature characteristic of the image pickup element, an offset OSR remains in a pixel signal D shown in FIG. 1 even when subtracting the compensation signal HC having the same level as an amount of offset FL1 of the offset OS from the pixel signal C. It is to be noted that signal levels LB shown in FIG. 1 and FIG. 2, which will be described in later, indicate a black level.

Japanese Patent No. 3104098 has disclosed an automatic defect compensation circuit of the image pickup element, in which a signal level of the compensation signal is changed based on the temperature changes of the image pickup element to compensate for the signal level of the image signal by using such the changed compensation signal, and when any defect is detected in the compensated image signal, the defect is concealed by a predetermined pre-sample image signal. If the pixel signal relative to the defective pixel has an increased level more than a predetermined level, any compensation of signal level using the compensation signal stops. Japanese Patent No. 3104098 and Japanese Patent Application Publication No. H06-113211 have disclosed that a memory stores any information relative to defective pixels and the defective pixels are compensated by using this information.

SUMMARY OF THE INVENTION

The image pickup apparatus has video amplifier(s) for amplifying an image signal output from image pickup elements, in order to be able to acquire an image signal having a desired signal level even under low-luminous intensity. When setting gain of the video amplifier(s) to a higher level in addition to the increase in the amount of the offset based on any fluctuation in the temperature characteristics of the image pickup element, it is difficult to perform any higher accurate defect compensation if a signal level of the compensation signal is also increased.

If, however, the signal level of the compensation signal is increased, it may be easy to result in over-compensation and be obviously influenced by this over-compensation. For example, when a pixel signal E shown in FIG. 2 has a small amount of the offset OS (i.e., when the compensation signal HC has a low signal level), it is possible to perform any defect compensation on the pixel signal E until the signal level of the pixel signal E reaches its saturation level LS so that a compensated pixel signal F shown in FIG. 2 can be acquired. It is to be noted that a signal level LC is a signal level when no offset result in a pixel signal. If any defect compensation is performed on a pixel signal G shown in FIG. 2 when its offset OS has a larger amount of the offset FL2 than the amount of the offset FL1 of the pixel signal E, this results in over-compensation by subtracting the compensation signal HC having the amount FL2 of the offset from the saturation level LS of the pixel signal G, so that a pixel signal H, shown in FIG. 2, having a signal level that is less than the signal level LC by an amount of offset FLv, which exceeds the saturation level LS in the pixel signal G, can be acquired. Further, If any defect compensation is performed on a pixel signal I shown in FIG. 2 when the signal level of the image signal I excluding the offset exceeds its saturation level LS, a pixel signal J shown in FIG. 2 having a level that is less than the saturation level LS by an amount of offset FL2, which exceeds the saturation level LS in the pixel signal I, can be acquired. Thus, the signal level of the compensated pixel signal J is very different from a signal level of the pixel that has no offset, so that the compensated pixel signal J can be obviously influenced by the over-compensation.

If there is a large amount of an offset, a signal component of the offset is predominant in the image signal as compared with a signal component by incident beam. Accordingly, it is difficult to compensate for a pixel signal to generate an image signal constituted of only signal component by the incident beam unless the offset is deleted with a high accuracy. Namely, if the compensation signal has a lower signal level than that of the image signal constituted of only signal component by the incident beam, even when a compensation signal contains any errors, any influence by the errors may be ignored. If, however, the compensation signal has a higher signal level than that of the image signal constituted of only signal component by the incident beam, it is difficult for any influence by the errors contained in the compensation signal to be ignored. If the image signal constituted of only signal component by the incident beam has a lower signal level than that of any errors contained in the compensation signal so that a subject is imaged under low luminous intensity, a signal level of the pixel signal relative to a defective pixel may be compensated to a different signal level from the signal level of the image signal constituted of only signal component by the incident beam, thereby resulting in deterioration in reliability of the defect compensation.

It is desirable to provide an image pickup apparatus, a defect compensation device, and defect-compensating method, which are capable of performing the defect compensation satisfactorily.

According to an embodiment of the present invention, there is provided an image pickup apparatus. The image pickup apparatus includes an image pickup device that contains an image pickup element. The image pickup device generates an image signal by using the image pickup element. The image pickup apparatus also has a defect-information-storing unit that stores defect information relative to a defective pixel in the image pickup element. The defective pixel results in an offset of a pixel signal generated for each pixel. The offset has a larger amount thereof than a predetermined amount. The image pickup apparatus further has a compensation-signal-generating unit that generates a compensation signal for each defective pixel based on the offset of the pixel signal relative to the defective pixel indicated by the defect information. The image pickup apparatus additionally has a first compensation unit that compensates for the pixel signal relative to the defective pixel indicated by the defect information with applying the compensation signal to the pixel signal and a second compensation unit that compensates for the pixel signal relative to the defective pixel indicated by the defect information without applying the compensation signal to the pixel signal. The image pickup apparatus still further has a compensation-switching unit that switches between a first signal compensated by the first compensation unit and a second signal compensated by the second compensation unit based on a comparison result of a signal level of the compensation signal with a signal level of a predetermined compensation-switching reference signal and sets the switched signal as the image signal in which the pixel signal relative to the defective pixel is compensated.

According to another embodiment of the invention, there is provided a defect compensation device. The defect compensation device also includes a defect-information-storing unit that stores defect information relative to a defective pixel that results in an offset of a pixel signal. The offset has a larger amount thereof than a predetermined amount. The defect compensation device includes a compensation-signal-generating unit that generates a compensation signal for each defective pixel based on the offset of the pixel signal relative to the defective pixel indicated by the defect information. The defect compensation device further includes a first compensation unit that compensates for the pixel signal relative to the defective pixel indicated by the defect information with applying the compensation signal to the pixel signal and a second compensation unit that compensates for the pixel signal relative to the defective pixel indicated by the defect information without applying the compensation signal to the image signal. The defect compensation device additionally includes a compensation-switching unit that switches between a first signal compensated by the first compensation unit and a second signal compensated by the second compensation unit based on a comparison result of a signal level of the compensation signal with a signal level of a predetermined compensation-switching reference signal and sets the switched signal as an image signal in which the pixel signal relative to the defective pixel is compensated.

According to further embodiment of the invention, there is provided a defect-compensating method that compensates for a pixel signal relative to a defective pixel in an image pickup element, which results in a larger offset of the pixel signal generated by the image pickup element for each pixel than a predetermined value by using defect information relative to the defective pixel, to obtain an image signal in which the pixel signal relative to the defective pixel is compensated. The method contains a compensation-signal-generating step of generating a compensation signal for each defective pixel based on the offset of the pixel signal relative to the defective pixel indicated by the defect information. The method also contains a first compensating step of compensating for the pixel signal relative to the defective pixel indicated by the defect information with applying the compensation signal to the pixel signal generated by the image pickup element and a second compensating step of compensating for the pixel signal relative to the defective pixel indicated by the defect information without applying the compensation signal to the pixel signal generated by the image pickup element. The method further contains a compensation-switching step of switching between a first signal compensated in the first compensating step and a second signal compensated by the second compensating step based on a comparison result of a signal level of the compensation signal with a signal level of a predetermined compensation-switching reference signal and setting the switched signal as the image signal in which the pixel signal relative to the defective pixel is compensated.

In the above embodiments, the compensation signal is generated for each defective pixel based on the offset of the pixel signal relative to the defective pixel indicated by the defect information relative to the defective pixel in the image pickup element, which results in the offset of the pixel signal generated for each pixel. The first signal obtained by compensation of the pixel signal relative to the defective pixel with using the compensation signal and the second signal obtained by compensation of the pixel signal relative to the defective pixel without using the compensation signal are switched based on a comparison result of a signal level of the compensation signal with a signal level of a predetermined compensation-switching reference signal. The switched signal is set as an image signal in which the pixel signal relative to the defective pixel is compensated.

It is to be noted that the defect information is referred to information that is used to compensate for a pixel signal relative to a defective pixel or defective pixels that results or result in the offset having a larger amount thereof than a predetermined level. The defect information contains a location of the defective pixel(s) and an amount of its (their) offset. It is also to be noted that the compensation is referred to any compensation of a pixel signal relative to defective pixel(s) and includes replacement of compensation generating any over-compensation with another and concealment of the compensation generating any over-compensation from another.

When the pixel signal relative to the defective pixel is compensated by using the compensation signal, the compensation signal is added or subtracted to or from the pixel signal relative to the defective pixel(s), which is generated by using the image pickup element, indicated by the defect information so that the offset of the pixel signal relative to the defective pixel indicated by the defect information can be deleted from the pixel signal.

When the pixel signal relative to the defective pixel is compensated by using no compensation signal, the pixel signal relative to the defective pixel having a signal level of the pixel signal generated for each pixel, which is independent on any incident beam, is compensated by using, for example, the fourth signal of peripheral pixels around the defective pixel. The compensation signal compensates for the signal level of the pixel signal based on temperature of the image pickup element and a gain when the image pickup device generates the pixel signal.

If a signal level of the compensation signal does not exceed a signal level of the predetermined compensation-switching reference signal, the first signal obtained by the compensation of the pixel signal relative to the defective pixel with using the compensation signal is set as the image signal in which the pixel signal relative to the defective pixel is compensated. If a signal level of the compensation signal exceeds a signal level of the predetermined compensation-switching reference signal, the second signal obtained by the compensation of the pixel signal relative to the defective pixel without using the compensation signal is set as the image signal in which the pixel signal relative to the defective pixel is compensated.

Thus, when the signal level of the compensation signal exceeds a signal level of the predetermined compensation-switching reference signal so that any over-compensation can occur, the second signal obtained by the compensation of the pixel signal relative to the defective pixel without using the compensation signal is set as the image signal in which the pixel signal relative to the defective pixel is compensated. This prevents the over-compensation from occurring, thereby enabling any defect compensation to be suitably performed.

The concluding portion of this specification particularly points out and directly claims the subject matter of the present invention. However, those skilled in the art will best understand both the organization and method of operation of the invention, together with further advantages and objects thereof, by reading the remaining portions of the specification in view of the accompanying drawing(s) wherein like reference characters refer to like elements.

DESCRIPTION OF THE PREFERRED EMBODIMENTS

The following will describe embodiments of the present invention with reference to the accompanied drawings.

Figure 3:
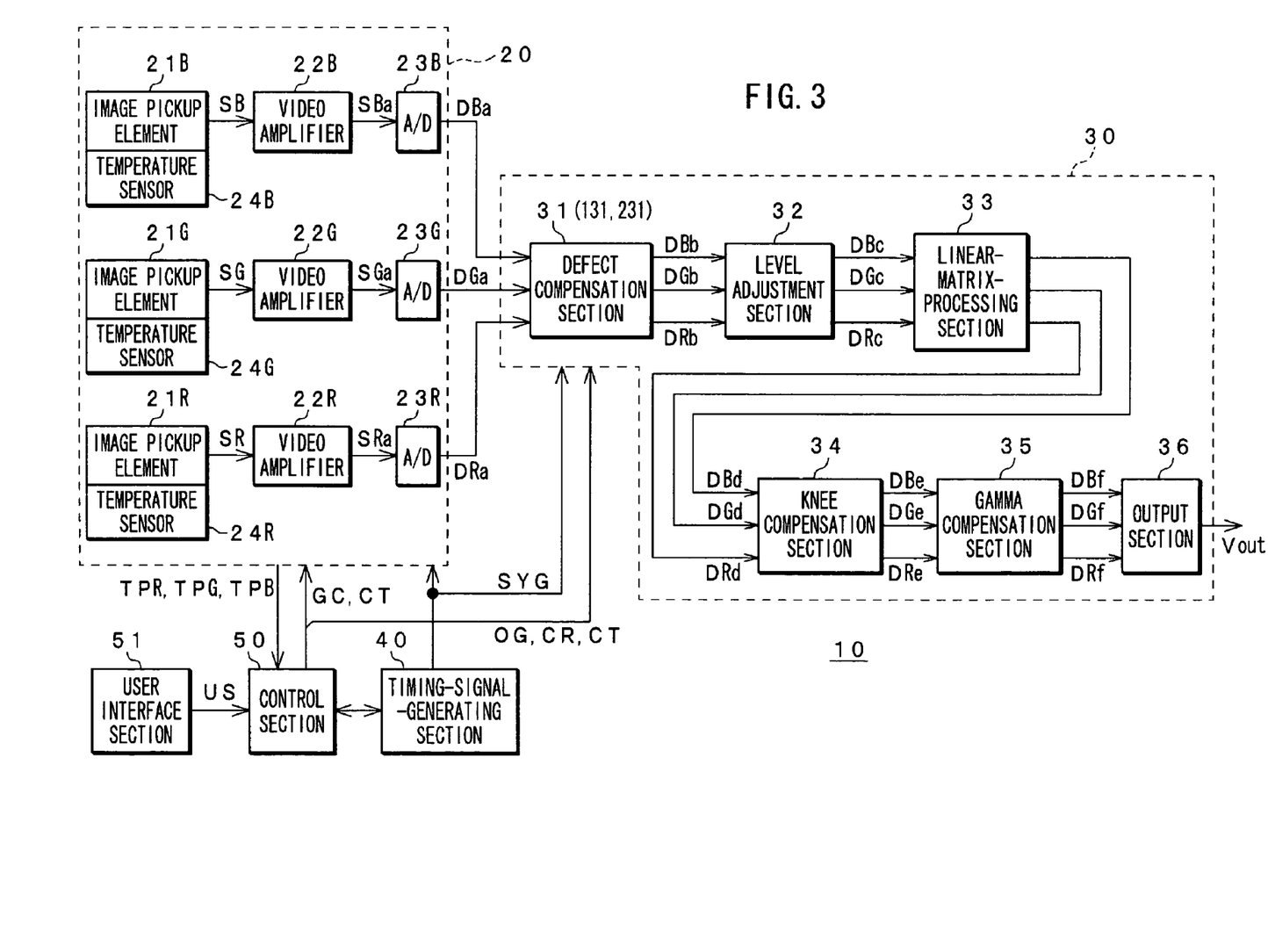
FIG. 3 is a block diagram for showing a configuration of an embodiment of an image pickup apparatus according to the invention.

FIG. 3 shows a configuration of an embodiment of an image pickup apparatus 10 according to the invention, to which a defect compensation device that compensates for a pixel signal relative to defective pixel(s) in the image pickup element is applied. It is to be noted that in FIG. 3, 3-chips image pickup apparatus 10 is shown in which an incident beam of a subject that is incident through an optical system, not shown, constituted of lens, iris or the like is separated into three primary colors by a color separation prism so that the separated beams are incident on each of the image pickup elements provided for the primary colors.

An image pickup device 20 in the image pickup apparatus 10 contains image pickup elements 21R, 21G and 21B, video amplifiers 22R, 22G and 22B, analog-to-digital (A/D) converters 23R, 23G and 23B.

The image pickup element 21R is constituted of a plurality of pixels each for performing photoelectric conversion. In the image pickup element 21R, each pixel generates a pixel signal based on red component of the beam separated by the color separation prism. The image pickup element 21R generates an image signal SR based on the pixel signal and supplies the video amplifier 22R with such the image signal SR.

The video amplifier 22R receives and amplifies the image signal SR to generate an image signal SRa with its gain being changed based on the gain-changing signal GC received from a control section 50, which will be described later. The video amplifier 22R then supplies the A/D converter 23R with the amplified image signal SRa. For example, even when imaging a subject under low-luminous intensity, it is possible to generate the image signal SRa having a desired signal level by increasing a gain in the video amplifier 22R based on the gain-changing signal GC. When imaging a subject under satisfactory luminous intensity, the video amplifier 22R supplies the A/D converter 23R with the image signal SR as the amplified image signal SRa.

The A/D converter 23R receives the image signal SRa from the video amplifier 22R and converts it to a digital image signal DRa. The A/D converter 23R then supplies the image-signal-processing device 30 with the digital image signal DRa.

The image pickup elements 21G, 21B are respectively constituted of a plurality of pixels each for performing photoelectric conversion, similar to the image pickup element 21R. In the image pickup element 21G, each pixel generates a pixel signal based on green component of the beam separated by the color separation prism. The image pickup element 21G generates an image signal SG based on the pixel signal and supplies the video amplifier 22G with such the image signal SG.

In the image pickup element 21B, each pixel generates a pixel signal based on blue component of the beam separated by the color separation prism. The image pickup element 21B generates an image signal SB based on the pixel signal and supplies the video amplifier 22B with such the image signal SB.

The video amplifiers 22G, 22B respectively have same configurations as that of the video amplifier 22R. The video amplifier 22G receives and amplifies the image signal SG to generate an image signal SGa with its gain being changed based on the gain-changing signal GC received from the control section 50, which will be described later. The video amplifier 22G then supplies the A/D converter 23G with the amplified image signal SGa.

The video amplifier 22B receives and amplifies the image signal SB to generate an image signal SBa with its gain being changed based on the gain-changing signal GC received from the control section 50, which will be described later. The video amplifier 22B then supplies the A/D converter 23B with the amplified image signal SBa.

The A/D converter 23G receives the image signal SGa from the video amplifier 22G and converts it to a digital image signal DGa. The A/D converter 23R then supplies the image-signal-processing device 30 with the digital image signal DGa.

The A/D converter 23B receives the image signal SBa from the video amplifier 22B and converts it to a digital image signal DBa. The A/D converter 23B then supplies the image-signal-processing device 30 with the digital image signal DBa.

The image pickup device 20 is also provided with a temperature sensor 24R for detecting temperature of the image pickup element 21R, a temperature sensor 24G for detecting temperature of the image pickup element 21G, and a temperature sensor 24B for detecting temperature of the image pickup element 21B. The temperature sensor 24R detects temperature of the image pickup element 21R and generates a sensor signal TPR indicating the detected temperature. The temperature sensor 24R then supplies the control section 50, which will be described later, with the sensor signal TPR. Similarly, the temperature sensors 24G, 24B detect temperature of the image pickup elements 21G, 21B, respectively, and generate sensor signals TPG, TPB indicating the detected temperatures. The temperature sensors 24G, 24B then supply the control section 50, which will be described later, with the sensor signals TPG, TRB, respectively.

It is to be noted that, base on a timing signal SYG received from a timing-signal-generating section 40, which will be described later, and a control signal CT received from the control section 50, the image pickup elements 21R, 21G, 21B generate the image signals SR, SG, SB and the A/D converters 23R, 23G, 23B perform A/D conversion processing.

A defect compensation section 31 in the image-signal-processing device 30 performs any defect compensation on the image signals DRa, DGa, DBa of the three primary colors received from the image pickup device 20 to compensate for a signal level of a pixel signal relative to any defective pixel(s) so that the defective pixel(s) can be inconspicuous. The defect compensation section 31 then generates image signals DRb, DGb, DBb and supplies a level adjustment section 32 with these compensated image signals DRb, DGb, DBb.

The level adjustment section 32 receives the image signals DRb, DGb, DBb and performs a black level adjustment on them to adjust a black level to hold its fluctuation by dark current on the image signals DRb, DGb, DBb. The level adjustment section 32 also performs a white level adjustment and the like on the image signals DRb, DGb, DBb to adjust their dynamic ranges. The level adjustment section 32 then generates image signals DRc, DGc, DBc and supplies a linear-matrix-processing section 33 with the adjusted image signals DRc, DGc, DBc.

The linear-matrix-processing section 33 receives the image signals DRc, DGc, DBc and performs any matrix operation on the image signals DRc, DGc, DBc using a predetermined matrix constant, in order to improve color reproducibility, to generate image signals DRd, DGd, DBd as its operation results. The linear-matrix-processing section 33 then supplies a Knee compensation section 34 with the image signals DRd, DGd, DBd.

The Knee compensation section 34 receives the image signals DRd, DGd, DBd and performs any compression processing on the image signals DRd, DGd, DBd to compress their high-luminance components so that the image signals DRe, DGe, DBe can be generated. The Knee compensation section 34 then supplies a gamma compensation section 35 with the image signals DRe, DGe, DBe.

The gamma compensation section 35 receives the image signals DRe, DGe, DBe and performs any nonlinear compensation on the image signals DRe, DGe, DBe, in order to establish their true gradation representations when displaying a shot image, to generate nonlinear-compensated image signals DRf, DGf, DBf. The gamma compensation section 35 then supplies an output section 36 with the image signals DRf, DGf, DBf.

The output section 36 receives the image signals DRf, DGf, DBf and generates an output signal Vout having a predetermined format from the image signals DRf, DGf, DBf and outputs it. For example, the output section 36 generates a composite signal from the image signals DRf, DGf, DBf and outputs it. The output section 36 also generates a luminance signal and a color-difference signal from the image signals DRf, DGf, DBf and outputs them as the output signal Vout.

The image-signal-processing device 30 also performs any detail processing or the like to enhance a profile of the shot image. In the image-signal-processing device 30, each processing is in synchronism with any image signals by using the timing signals SYG received from the timing-signal-generating section 40.

The timing-signal-generating section 40 generates the timing signal SYG constituted of a clock signal, a horizontal synchronization signal, a vertical synchronization signal and the like. The timing-signal-generating section 40 then supplies the image pickup device 20, the image-signal-processing device 30, and the control section 50 with the timing signal SYG.

The control section 50 is connected with a user interface section 51. The user interface section 51 contains an interface for connecting any external equipment such as a camera control unit and an operation switch that a user manipulates. The user interface section 51 also supplies the control section 50 with an operation signal US such as a signal that is supplied from the external equipment to control operations of the image pickup apparatus 10 and a signal generated when the user manipulates the switch.

The control section 50 generates a control signal CT based on the operation signal US and supplies the image pickup device 20 and the image-signal-processing device 30 with the control signal CT to control the operations of the image pickup apparatus 10 so that the image pickup apparatus 10 can operate according to any instructions from the external equipment or any user's switch manipulations.

The control section 50 also generates an offset adjustment signal OG based on the sensor signals TPR, TPG, TPB received from the temperature sensors 24R, 24G, 24B and the gains of the video amplifiers 22R, 22G, 22B set by the gain-changing signal GC to compensate for the pixel signal relative to the defective pixel(s) suitably in the defect compensation section 31. The control section 50 then supplies the defect compensation section 31 with the offset adjustment signal OG. The control section 50 further generates a compensation-switching reference signal CR that is a reference signal for switching the defect-compensating methods based on a signal level of the compensation signal generated according to an offset of a pixel signal relative to the defective pixel(s), which will be described later. The control section 50 then supplies the defect compensation section 31 with the compensation-switching reference signal CR.

Figure 4:
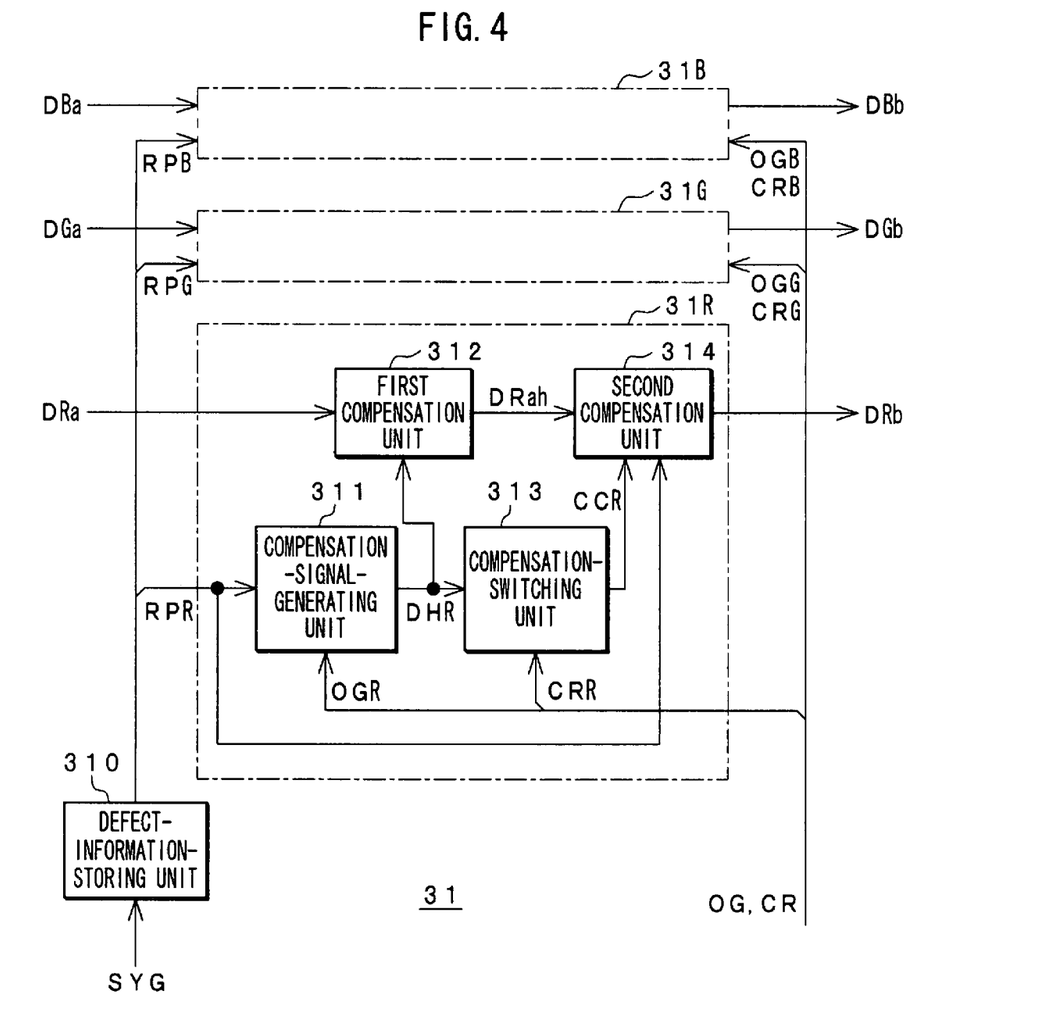
FIG. 4 is a block diagram for showing a configuration of an embodiment of a defect compensation section according to the invention.

FIG. 4 shows a configuration of the defect compensation section 31 as an embodiment of a defect compensation device according to the invention. The defect compensation section 31 contains defect-compensation-processing parts 31R, 31G, 31B. The defect-compensation-processing part 31R performs any defect compensation on the image signal DRa generated based on the red component of the beam. The defect-compensation-processing part 31G performs any defect compensation on the image signal DGa generated based on the green component of the beam. The defect-compensation-processing part 31B performs any defect compensation on the image signal DBa generated based on the blue component of the beam. The defect compensation section 31 also contains a defect-information-storing unit 310 that stores defect information relative to the defective pixels in the image pickup elements.

The defect-compensation-processing parts 31R, 31G, 31B have the same configuration as those of others. It is to be noted that, in order to make a description thereof simple, the following will describe only the defect-compensation-processing part 31R, so that detailed description of the defect-compensation-processing parts 31G, 31B will be omitted.

The defect-information-storing unit 310 is constituted of a nonvolatile memory and a memory controller, both not shown. The nonvolatile memory stores the defect information relative to the first defective pixel in which the pixel signal, which is generated for each pixel, relative to the defective pixel in the image pickup element 21R results in a greater offset than a level that has been previously set. The nonvolatile memory also stores the defect information relative to the second defective pixel in which the pixel signal relative to the defective pixel results in a signal having a level that is independent on an incident beam. The memory controller supplies the defect-compensation-processing part 31R with the above-mentioned defect information with it being in synchronism with the image signal DRa supplied to the defect-compensation-processing part 31R by utilizing the timing signal SYG received from the timing-signal-generating section 40.

This defect information contains information relative to a location and an amount of offset of the first defective pixel(s) and a location of the second defective pixel(s). If it is supposed that each of the pixels in the image pickup element corresponds to any memory address, each of the pieces of the defect information can be stored in a memory address corresponding to the defective pixel. For example, if the defective pixel is the first defective pixel, data indicating an amount of offset thereof is stored in a memory address corresponding to this first defective pixel. If the defective pixel is the second defective pixel, data peculiar to the second defective pixel, which is not used as the data for the first defective pixel, is stored in a memory address corresponding to this second defective pixel.

Thus, if each pixel corresponds to a memory address, the image pickup element 21R transmits the pixel signal in order to generate the image signal SR and the memory controller in the defect-information-storing unit 310 reads the data out of its nonvolatile memory with, for example, a memory address being incremented for each reading of the pixel signal based on the timing signal SYG, thereby enabling the defect information to be supplied to the defect-compensation-processing part 31R with the defect information being in synchronism with the image signal DRa supplied to the defect-compensation-processing part 31R. In other words, when a signal relative to the first defective pixel is supplied to the defect-compensation-processing part 31R, the data indicating an amount of offset thereof is supplied to the defect-compensation-processing part 31R as the defect information RPR. Alternatively, when a signal relative to the second defective pixel is supplied to the defect-compensation-processing part 31R, the data, which is peculiar to the second defective pixel, indicating the second defective pixel is supplied to the defect-compensation-processing part 31R as the defect information RPR.

The defect-information-storing unit 310 may store location data and the amount of offset of the first defective pixel and location data of the second defective pixel as the defect information. In this case, the memory controller in the defect-information-storing unit 310 finds a location of a pixel by the image signal DRa supplied to the defect-compensation-processing part 31R based on the timing signal SYG. If this pixel location agrees with a location of the first defective pixel in the pixel location data stored in the nonvolatile memory, the memory controller supplies the defect-compensation-processing part 31R with the amount of offset of the first defective pixel as the defect information RPR. If this pixel location agrees with a location of the second defective pixel in the pixel location data stored in the nonvolatile memory, the memory controller supplies the defect-compensation-processing part 31R with a flag or the like indicating the second defective pixel as the defect information RPR.

This defect information is generated so that, for example, a prescribed subject is imaged by an image pickup apparatus at a manufacture of the image pickup apparatus to determine the first and second defective pixels automatically based on a signal level of a pixel signal relative to each of the pixels. Such the defect information is stored in the nonvolatile memory in the defect-information-storing unit 310 based on a determination result. A user may determine the first and second defective pixels automatically according to his or her operation. If the defect information stored in the defect-information-storing unit 310 can be updated based on the determination result, the defect information relative to the defective pixel(s) can be stored in the defect-information-storing unit 310 even when any defective pixel occurs after a use of the image pickup apparatus starts. This enables to be compensated the defective pixel(s) that occurs or occur after a use of the image pickup apparatus starts.

A compensation-signal-generating unit 311 in the defect-compensation-processing part 31R receives an offset adjustment signal OGR from the control section 50. The compensation-signal-generating unit 311 performs any operation processing on the amount of offset indicated by the defect information RPR by using the offset adjustment signal OGR to generate a compensation signal DHR for deleting the offset from a pixel signal relative to the first defective pixel. The compensation-signal-generating unit 311 then supplies the compensation signal DHR to a first compensation unit 312 and a compensation-switching unit 313. For example, if the offset adjustment signal OGR relates to a temperature factor of the image pickup element 21R relative to the offset of a pixel signal of the first defective pixel or a rate of offset fluctuation based on the gain in the video amplifier 22R, the compensation-signal-generating unit 311 multiplies the amount of offset indicated by the defect information RPR by the offset adjustment signal OGR to generate the compensation signal DHR.

If the offset adjustment signal OGR relates to an amount of offset fluctuation owing to any temperature changes or an amount of offset fluctuation on the change of gain in the video amplifier 22R, the compensation-signal-generating unit 311 adds the offset adjustment signal OGR to the amount of offset indicated by the defect information RPR to generate the compensation signal DHR.

The first compensation unit 312 receives the image signal DRa from the image pickup device 20. The first compensation unit 312, for example, subtracts the compensation signal DHR corresponding to the first defective pixel(s) from the pixel signal relative to the first defective pixel in the image signal DRa to delete the offset from the pixel signal relative to the first defective pixel. Thus, the first compensation unit 312 generates the image signal DRah from which the offset has been deleted and supplies a second compensation unit 314 with the image signal DRah.

The compensation-switching unit 313 receives the compensation-switching reference signal CRR from the control section 50. The compensation-switching unit 313 compares a signal level of the compensation signal DHR with that of the compensation-switching reference signal CRR. Based on this comparison result thereof, the compensation-switching unit 313 generates the compensation-switching signal CCR to switch the defect-compensating method and supplies the second compensation unit 314 with the compensation-switching signal CCR. It is to be noted that the compensation-switching signal CCR also indicates information on whether or not the compensation-switching unit 313 has received the compensation signal DHR.

The second compensation unit 314 compensates for a pixel signal relative to the defective pixel(s) without using the compensation signal if the defect information RPR received from the defect-information-storing unit 310 indicates that the image signal DRah received from the first compensation unit 312 relates to a pixel signal relative to the second defective pixel. For example, the second compensation unit 314 compensates for the pixel signal relative to the defective pixel(s) by replacing or concealing the compensation signal with of from a replacement (concealment) signal that is generated by using a signal relative to peripheral pixels around the defective pixel, to generate a compensated image signal DRb. Further, if the compensation-switching signal CCR also indicates that the signal level of the compensation signal DHR exceeds that of the compensation-switching reference signal CRR, a pixel signal relative to the first defective pixel (s) to be compensated by using this compensation signal DHR may be compensated by using the signal relative to the peripheral pixels around the defective pixel, similar to the above, to generate the compensated image signal DRb. The second compensation unit 314 supplies the level adjustment section 32 with this compensated image signal DRb.

The defect-compensation-processing part 31G performs any defect compensation similar to that of the defect-compensation-processing part 31R on the image signal DGa based on the defect information RPG relative to the image pickup element 21G stored in the defect-information-storing unit 310 to generate a compensated image signal DGb. The defect-compensation-processing part 31G then supplies the level adjustment section 32 with the compensated image signal DGb. It is to be noted that a compensation-signal-generating unit 311 in the defect-compensation-processing part 31G adjusts a signal level of the compensation signal according to temperature of the image pickup element 21G and a gain of the video amplifier 22G based on the offset adjustment signal OBG received from the control section 50. A compensation-switching unit 313 in the defect-compensation-processing part 31G performs compensation switching by using a compensation-switching reference signal CRG.

The defect-compensation-processing part 31B performs any defect compensation similar to that of the defect-compensation-processing part 31R on the image signal DBa based on the defect information RPB relative to the image pickup element 21B stored in the defect-information-storing unit 310 to generate a compensated image signal DBb. The defect-compensation-processing part 31B then supplies the level adjustment section 32 with the compensated image signal DBb. It is to be noted that a compensation-signal-generating unit 311 in the defect-compensation-processing part 31B adjusts a signal level of the compensation signal according to temperature of the image pickup element 21B and a gain of the video amplifier 22B based on the offset adjustment signal OBG received from the control section 50. A compensation-switching unit 313 in the defect-compensation-processing part 31B performs compensation switching by using a compensation-switching reference signal CRB.

The following will describe operations of the defect compensation. When the image signal DRa supplied to the defect-compensation-processing part 31R relates to a pixel signal relative to the first defective pixel, the defect-compensation-processing part 31R receives the defect information RPR from the defect-information-storing unit 310. The compensation-signal-generating unit 311 of the defect-compensation-processing part 31R performs operation processing on the amount of offset indicated by the defect information RPR by using the offset adjustment signal OGR to generate the compensation signal DHR. The compensation-signal-generating unit 311 then supplies the compensation signal DHR to the first compensation unit 312 and the compensation-switching unit 313.

The first compensation unit 312 adds the compensation signal DHR generated in the compensation-signal-generating unit 311 to the image signal DRa to delete the offset occurred in the first defective pixel from the pixel signal relative to the first defective pixel. The first compensation unit 312 then generates the compensated image signal DRah and supplies the second compensation unit 314 with it.

The compensation-switching unit 313 compares the compensation signal DHR with the compensation-switching reference signal CRR received from the control section 50 to generate the compensation-switching signal CCR indicating the comparison result thereof. The compensation-switching unit 313 then supplies the second compensation unit 314 with the compensation-switching signal CCR.

The second compensation unit 314 performs any compensation on the image signal DRah received from the first compensation unit 312 so that a pixel signal relative to the second defective pixel indicated by the defect information RPR can be compensated. When the compensation-switching signal CCR indicates that the signal level of the compensation signal DHR exceeds that of the compensation-switching reference signal CRR, the second compensation unit 314 compensates for a pixel signal relative to the first defective pixel(s) to be compensated by using the compensation signal DHR by means of using the signal relative to the peripheral pixels around the first defective pixel. The pixel signal in the image signal DRah is compensated in the first and second compensation units 312, 314 to generate an image signal DRb. This image signal DRb is supplied to the level adjustment section 32.

Further, the defect-compensation-processing parts 31G, 31B also perform defect compensation operations similar to those of the defect-compensation-processing part 31R to generate compensated image signals DGb, DBb. The defect-compensation-processing parts 31G, 31B then supplies the level adjustment section 32 with the compensated image signals DGb, DBb.

Thus, such the defect compensation operations in the defect-compensation-processing parts 31R, 31G, 31B enables the first compensation unit 312 to compensate for the pixel signal relative to the first defective pixel suitably even if the amount of offset of pixel signal relative to the first defective pixel in the image signals DRa, DGa, DBa is changed based on the temperature of the image pickup element and the gain in the video amplifier. When the signal level of the compensation signal exceeds that of the compensation-switching reference signal CR, the second compensation unit 314 compensates for the pixel signal relative to the first defective pixel(s). If, thus, any over-compensation may occur when the defect compensation is performed in the first compensation unit 312, the second compensation unit 314 compensates for the pixel signal relative to the first defective pixel(s) without using the compensation signal, so that any over-compensation-free defect compensation can be performed.

Although the first and second compensation units 312, 314 have been connected to each other by using a cascade connection in the defect compensation section 31 shown in FIG. 4, the first and second compensation units 312, 314 can be connected to each other by using a parallel connection, thereby obtaining the same excellent effects as the above.

Figure 5:
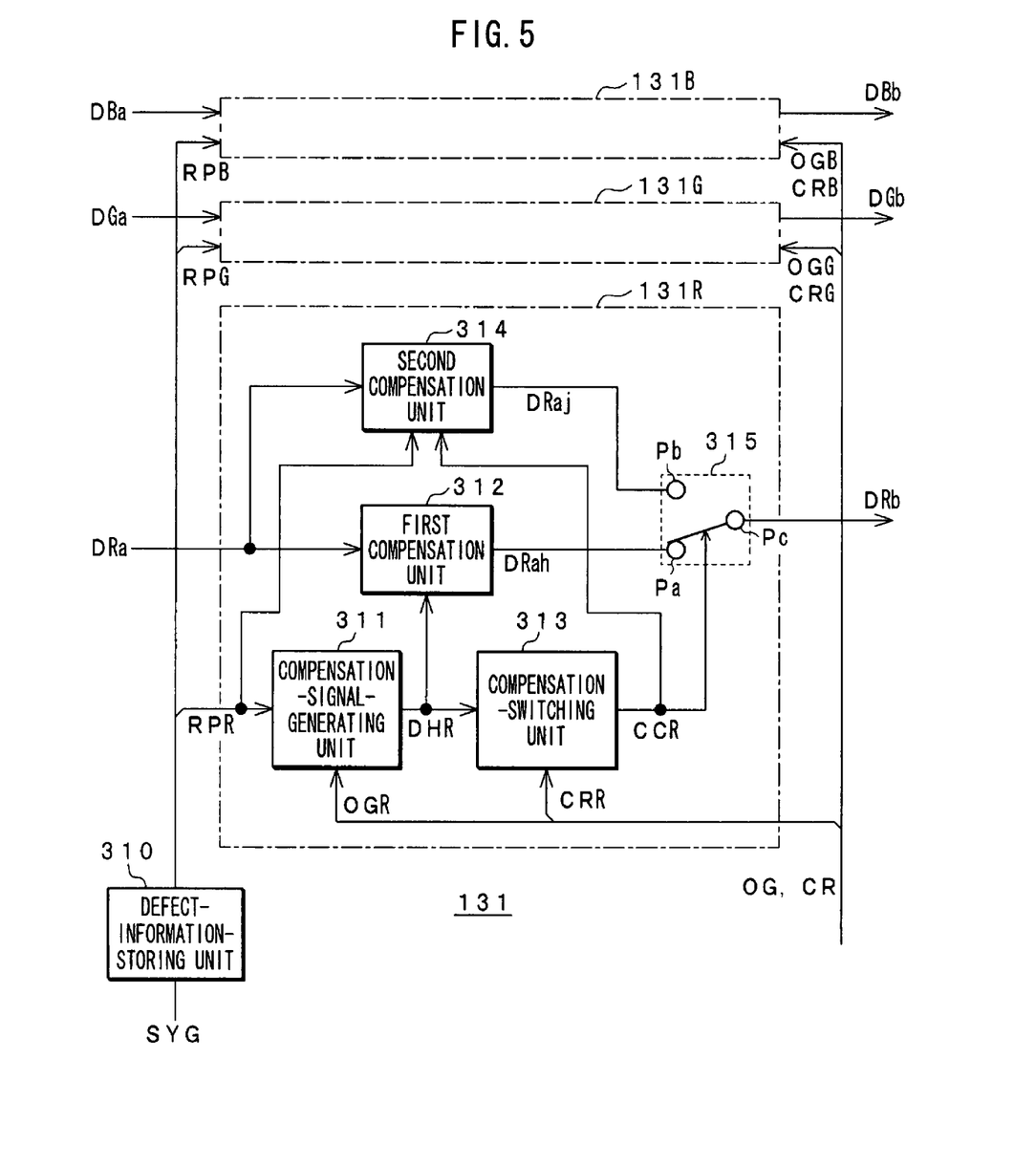
FIG. 5 is a block diagram for showing a configuration of another embodiment of the defect compensation section according to the invention.

FIG. 5 shows a configuration of a defect compensation section 131 as another embodiment of a defect compensation device according to the invention, in which the first and second compensation units 312, 314 are connected to each other by using a parallel connection. Defect-compensation-processing parts 131R, 131G, 131B in the defect compensation section 131 have configurations similar to each other. The following will describe only the defect-compensation-processing part 131R and detailed description of the defect-compensation-processing parts 131G, 131B will be omitted. Like reference characters in FIG. 5 refer to like elements shown in FIG. 4, detailed description of which will be omitted.

An image signal DRa is supplied to both of the first and second compensation units 312, 314 in the defect-compensation-processing part 131R. The first compensation unit 312 performs any compensation on the image signal DRa so that a pixel signal relative to the first defective pixel(s) can be compensated. The first compensation unit 312 then generates a compensated image signal DRah and supplies a fixed terminal Pa of a signal changeover switch 315 with the compensated image signal DRah. The second compensation unit 314 performs any compensation on the image signal DRa so that the pixel signal relative to the second defective pixel(s) can be compensated. The second compensation unit 314 then generates a compensated image signal DRaj and supplies a fixed terminal Pb of the signal changeover switch 315 with the compensated image signal DRaj. When the compensation-switching signal CCR indicates that the signal level of the compensation signal DHR exceeds that of the compensation-switching reference signal CRR, the second compensation unit 314 performs any compensation on the pixel signal relative to the first defective pixel, the offset of which is to be compensated by using the compensation signal DHR.

A moving (common) terminal Pc in the signal changeover switch 315 is connected either to the fixed terminal Pa or the fixed terminal Pb to change its connection over so that the image signal DRah or DRaj can be selected. The signal changeover switch 315 supplies the level adjustment section 32 with the selected image signal as the image signal DRb.

In this signal changeover switch 315, for example, the moving (common) terminal Pc is first connected to the fixed terminal Pb. When the compensation-switching signal CCR received from the compensation-switching unit 313 indicates that the compensation signal DHR is supplied to the compensation-switching unit 313 and the signal level of the compensation signal DHR does not exceed that of the compensation-switching reference signal CRR, the signal changeover switch 315 switches the connection of the moving (common) terminal Pc to the fixed terminal Pa so that the image signal DRah in which the pixel signal relative to the first defective pixel(s) has been compensated can be selected.

Such the configuration allows the image signal DRah, the offset of which has been deleted by using the compensation signal DHR, to be selected relative to the first defective pixel (s) for which the compensation signal DHR has a signal level that does not exceed that of the compensation-switching reference signal CRR. The selected image signal DRah is then supplied to the level adjustment section 32 as the image signal DRb. Alternatively, such the configuration allows the image signal DRaj, the defect compensation of which has been performed by using the signal relative to the peripheral pixels, to be selected relative to the first defective pixel(s) for which the compensation signal DHR has a signal level that exceeds that of the compensation-switching reference signal CRR and the second defective pixel(s). The selected image signal DRaj is then supplied to the level adjustment section 32 as the image signal DRb. It is to be noted that if there is no defective pixel, the image signal DRa supplied from the image pickup device 20 is supplied to the level adjustment section 32 through the second compensation unit 314 and the signal changeover switch 315 as the image signal DRb.

Further, the defect-compensation-processing parts 131G, 131B have the same configurations as that of the defect-compensation-processing part 131R, so that the defect-compensation-processing parts 131G, 131B can supplies the level adjustment section 32 with the image signals DGb, DBb in which the defect compensation has been performed, similar to the defect-compensation-processing part 131R. Thus, the defect compensation section 131 supplies the level adjustment section 32 with the image signals DRb, DGb, DBb, similar to the defect compensation section 31 shown in FIG. 3.

Thus, similar to the defect compensation section 31 shown in FIG. 3, such the defect compensation section 131 having the above-mentioned configuration enables the first compensation unit 312 to compensate for the pixel signal relative to the first defective pixel suitably even if the amount of offset of the pixel signal relative to the first defective pixel in the image signals DRa, DGa, DBa is changed based on the temperature of the image pickup element and the gain in the video amplifier. If any over-compensation may occur when the first compensation unit 312 performs any defect compensation, the second compensation unit 314 compensates for the pixel signal relative to the first defective pixel(s), thereby allowing over-compensation-free defect compensation to be performed.

According to the above embodiments, when a signal level of the compensation signal exceeds that of the compensation-switching reference signal, the second compensation unit 314 has compensated for a pixel signal relative to the first defective pixel(s), any defect of which has been to be compensated by using this compensation signal, in the defect compensation sections 31, 131 shown in FIGS. 4, 5. The image signal on the compensated pixel signals relative to the first defective pixel (s), however, can be generated by using a defect compensation result relative to the first defective pixel(s) obtained by the first compensation unit 312 and a defect compensation result when the second compensation unit 314 compensates for the pixel signal relative to the first defective pixel(s).

Figure 6:
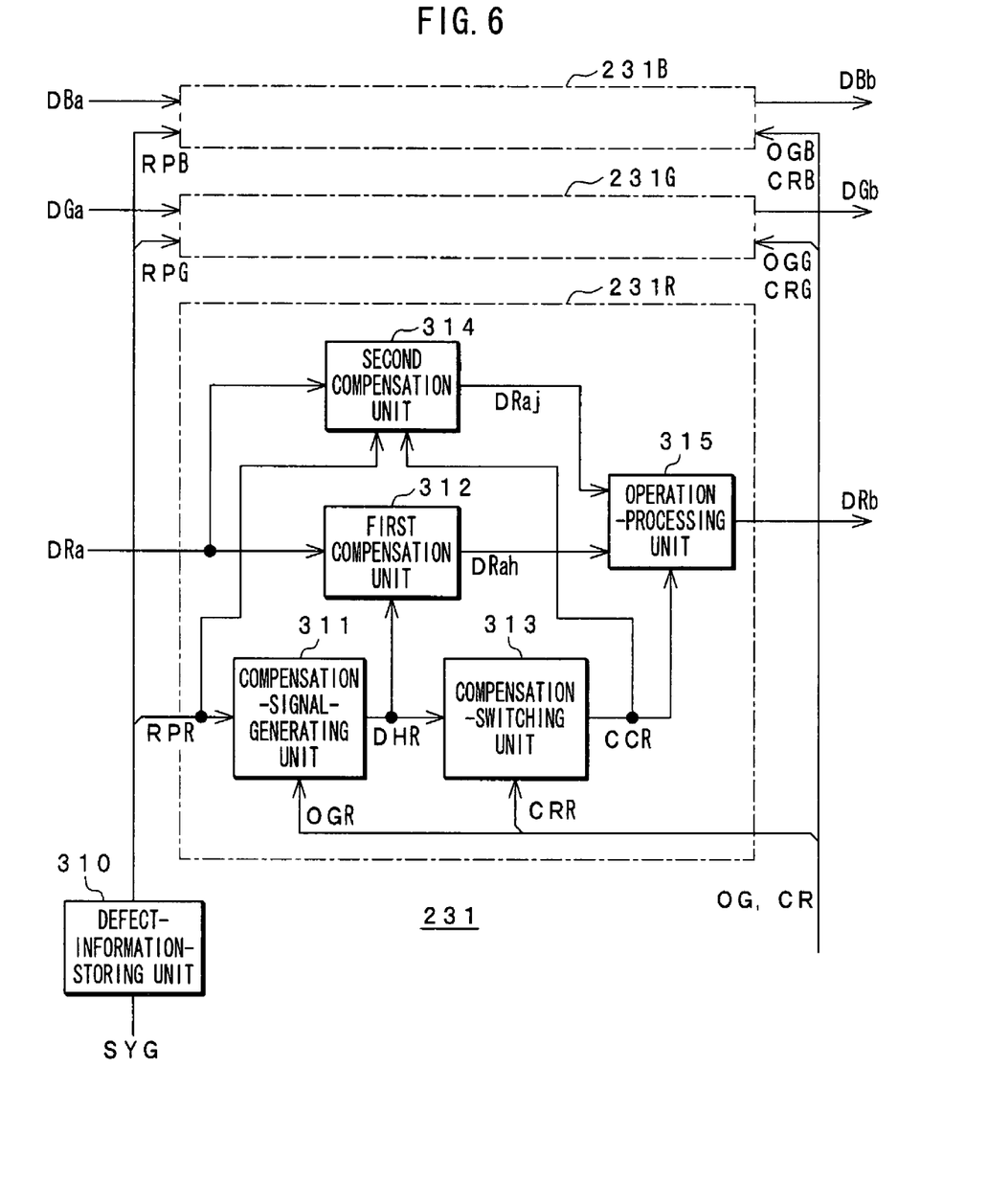
FIG. 6 is a block diagram for showing a configuration of further embodiment of the defect compensation section according to the invention.

FIG. 6 shows a configuration of a defect compensation section 231 as further embodiment of a defect compensation device according to the invention, in which an image signal on the compensated pixel signal relative to the first defective pixel(s) is generated by using a defect compensation result relative to the first defective pixel(s) obtained by the first compensation unit 312 and a defect compensation result when the second compensation unit 314 compensates for the pixel signal relative to the first defective pixel(s).

Defect-compensation-processing parts 231R, 231G, 231B in the defect compensation section 231 have configurations similar to each other. The following will describe only the defect-compensation-processing part 131R in detail and detailed description of the defect-compensation-processing parts 231G, 231B will be omitted. Like reference characters in FIG. 6 refer to like elements shown in FIGS. 4, 5, detailed description of which will be omitted.

The first compensation unit 312 supplies an image signal DRah after compensation to an operation-processing unit 316. The second compensation unit 314 supplies an image signal DRaj after compensation to the operation-processing unit 316.

The compensation-switching unit 313 compares a signal level of the compensation signal DHR with that of the compensation-switching reference signal CRR to generate a compensation-switching signal CCR indicating this comparison result. The compensation-switching unit 313 then supplies the second compensation unit 314 and the operation-processing unit 316 with the compensation-switching signal CCR.

The operation-processing unit 316 performs any operation processing on the image signal DRah received from the first compensation unit 312 and the image signal DRaj received from the second compensation unit 314. The operation-processing unit 316 then supplies the level adjustment section 32 with this operation result. In this operation processing, the image signals DRah, DRaj are respectively multiplied by factors and the multiplied results are added to each other.

For example, the operation-processing unit 316 multiplies the image signals DRah, DRaj, respectively, by a factor Kh (=0.5) and a factor Kj (=0.5) when the compensation-switching signal CCR received from the compensation-switching unit 313 indicates that the signal level of the compensation signal DHR exceeds that of the compensation-switching reference signal CRR. The operation-processing unit 316 then adds them to each other. In this moment, the operation result indicates an average value of the image signals DRah, DRaj. The operation-processing unit 316 then supplies the level adjustment section 32 with a signal relative to such the average values as the image signal DRb.

When the compensation-switching signal CCR indicates that the signal level of the compensation signal DHR does not exceed that of the compensation-switching reference signal CRR, the factor Kh is set to one and the factor Kj is set to zero. In this moment, the operation result indicates the image signal DRah received from the first compensation unit 312. The operation-processing unit 316 then supplies the level adjustment section 32 with a signal relative to such the operation result as the image signal DRb.

When the compensation-switching signal CCR indicates that the compensation signal DHR is not supplied, namely, that it is not a defective pixel, the image signals DRah, DRaj are identical to each other. Accordingly, the factors are set to any one among them such as "Kh=1, Kj=0", "Kh=0, Kj=1" and "Kh=0.5, Kj=0.5". In other words, the image signal DRa received from the image pickup device 20 is supplied to the level adjustment section 32 as the image signal DRb.

Thus, if the signal level of the compensation signal DHR exceeds that of the compensation-switching reference signal CRR, the signal operated by using the pixel signal compensated in the first compensation unit 312 and the pixel signal compensated in the second compensation unit 314 is used as the compensated image signal thereof.

Further, the defect-compensation-processing parts 231G, 231B performs the same operations as those of the defect-compensation-processing part 231R to generate the compensated image signals DGb, DBb, so that the defect-compensation-processing parts 231G, 231B can supplies the level adjustment section 32 with the image signals DGb, DBb.

Thus, for example, even if any considerable deterioration in frequency characteristics of the image signal occurs when the second compensation unit 314 compensates for the pixel signal relative to the first defective pixel(s), the signal after compensation may contain a pixel signal relative to the first defective pixel(s) when the pixel signal compensated in the first compensation unit 312 is used. This enables the deterioration in frequency characteristics thereof to be reduced.

Although the control section 50 has supplied the defect compensation sections 31, 131, 231, respectively, with the offset adjustment signal OG to adjust the signal level of the compensation signal in the above embodiments, the signal level of the compensation signal can be adjusted based on temperature of the image pickup element 21R, 21G, 21B and gains of the video amplifiers 22R, 22G, 22B by supplying the compensation-signal-generating unit 311 with any information indicating the sensor signals TPR, TPG, TPB and gains of the video amplifiers 22R, 22G, 22B.

Further, each of the defect compensation sections 31, 131, 231 has been provided with the defect-information-storing unit 310, the defect-information-storing unit 310 may be separately prepared from each of the defect compensation sections 31, 131, 231 if any defect information is used in each of the defect compensation sections 31, 131, 231. For example, if the image pickup device 20 is provided with the defect-information-storing unit 310, it is possible to adjust the defect information stored in the defect-information-storing unit to the image pickup element easily. This allows administration of the image pickup device 20 and the image-signal-processing device 30 to be facilitated as compared with a case where each of the defect compensation sections 31, 131, 231 is provided with the defect-information-storing unit 310.

Although, in the above embodiments, the compensation has been referred to any compensation of a pixel signal relative to defective pixel(s), the compensation may include replacement of compensation generating any over-compensation with another and concealment of the compensation generating any over-compensation from another.

It should be understood by those skilled in the art that various modifications, combinations, sub-combinations and alternations may occur depending on design requirements and other factors insofar as they are within the scope of the appended claims or the equivalents thereof.

What is claimed is:

1. An image pickup apparatus comprising:
an image pickup device that contains an image pickup element, said image pickup device generating an image signal by using the image pickup element;
a defect-information-storing unit that stores defect information relative to a defective pixel in the image pickup element, said defective pixel resulting in an offset of a pixel signal generated for each pixel, said offset having a larger amount thereof than a predetermined amount;
a compensation-signal-generating unit that generates a compensation signal for each defective pixel based on the offset of the pixel signal relative to the defective pixel indicated by the defect information;
a first compensation unit that compensates for the pixel signal relative to the defective pixel indicated by the defect information with applying the compensation signal to the pixel signal;
a second compensation unit that compensates for the pixel signal relative to the defective pixel indicated by the defect information without applying the compensation signal to the pixel signal; and
a compensation-switching unit that switches between a first signal compensated by the first compensation unit and a second signal compensated by the second compensation unit based on a comparison result of a signal level of the compensation signal with a signal level of a predetermined compensation-switching reference signal and sets the switched signal as the image signal in which the pixel signal relative to the defective pixel is compensated, the compensation-switching unit sets the first signal compensated the first compensation unit as the image signal in which the pixel signal relative to the defective pixel is compensated when a signal level of the compensation signal does not exceed a signal level of the predetermined compensation-switching reference signal and the compensation-switching unit sets the second signal compensated by the second compensation unit as the image signal in which the pixel signal relative to the defective pixel is compensated when a signal level of the compensation signal exceeds a signal level of the predetermined compensation-switching reference signal.

2. The image pickup apparatus according to claim 1 wherein the defect-information-storing unit stores defect information relative to a defective pixel having a signal level of the pixel signal generated for each pixel, said signal level being independent on incident beam; and
wherein the second compensation unit compensates for the pixel signal relative to the defective pixel having the signal level that is independent on the incident beam.

3. The image pickup apparatus according to claim 1 wherein the second compensation unit compensates for the pixel signal relative to the defective pixel indicated by the defect information by using a fourth signal of peripheral pixels around the defective pixel.

4. The image pickup apparatus according to claim 1 wherein the compensation-signal-generating unit compensates for a signal level of the compensation signal based on at least one of temperature of the image pickup element and a gain when the image pickup device generates the image signal.

5. The image pickup apparatus according to claim 1 wherein the image pickup device generates a digital image signal.

6. The image pickup apparatus according to claim 1 wherein the defect information contains information relative to a location of the defective pixel and an amount of the offset.

7. A defect compensation device comprising:
a defect-information-storing unit that stores defect information relative to a defective pixel that results in an offset of a pixel signal, said offset having a larger amount thereof than a predetermined amount;
a compensation-signal-generating unit that generates a compensation signal for each defective pixel based on the offset of the pixel signal relative to the defective pixel indicated by the defect information;
a first compensation unit that compensates for the pixel signal relative to the defective pixel indicated by the defect information with applying the compensation signal to the pixel signal;
a second compensation unit that compensates for the pixel signal relative to the defective pixel indicated by the defect information without applying the compensation signal to the image signal; and
a compensation-switching unit that switches between a first signal compensated by the first compensation unit and a second signal compensated by the second compensation unit based on a comparison result of a signal level of the compensation signal with a signal level of a predetermined compensation-switching reference signal and sets the switched signal as an image signal in which the pixel signal relative to the defective pixel is compensated, the compensation-switching unit sets the first signal compensated by the first compensation unit as the image signal in which the pixel signal relative to the defective pixel is compensated when a signal level of the compensation signal does not exceed a signal level of predetermined compensation-switching reference signal and the compensation-switching unit sets the second signal compensated by the second compensation unit as the image signal in which the pixel signal relative to the defective pixel is compensated when a signal level of the compensation signal exceeds a signal level of the predetermined compensation-switching reference signal.

8. An image pickup apparatus comprising:
an image pickup device that contains an image pickup element, said image pickup device generating an image signal by using the image pickup element;
a defect-information-storing unit that stores defect information relative to a defective pixel in the image pickup element, said defective pixel resulting in an offset of a pixel signal generated for each pixel, said offset having a larger amount thereof than a predetermined amount;
a compensation-signal-generating unit that generates a compensation signal for each defective pixel based on the offset of the pixel signal relative to the defective pixel indicated by the defect information;
a first compensation unit that compensates for the pixel signal relative to the defective pixel indicated by the defect information with applying the compensation signal to the pixel signal;
a second compensation unit that compensates for the pixel signal relative to the defective pixel indicated by the defect information without applying the compensation signal to the pixel signal;
an operation-processing unit that receives the first signal compensated by the first compensation unit and the second signal compensated by the second compensation unit and performs operation processing on the first and second signals; and
a compensation-switching unit that switches between a first signal compensated by the first compensation unit and a second signal compensated by the second compensation unit based on a comparison result of a signal level of the compensation signal with a signal level of a predetermined compensation-switching reference signal and sets the switched signal as the image signal in which the pixel signal relative to the defective pixel is compensated,
the compensation-switching unit switches an output of the operation-processing unit to output the first signal compensated by the first compensation unit therefrom as an operation result when a signal level of the compensation signal does not exceed a signal level of the predetermined compensation-switching reference signal, and to output a third signal obtained by the operation using the first signal compensated by the first compensation unit and the second signal compensated by the second compensation unit therefrom as the operation result when the signal level of the compensation signal exceeds the signal level of the predetermined compensation-switching reference signal, and the operation-processing unit sets any one of the first and third signals as the image signal in which pixel signal relative to the defective pixel is compensated.

9. A defect-compensating method that compensates for a pixel signal relative to a defective pixel in an image pickup element, said defective pixel resulting in a larger offset of the pixel signal generated by the image pickup element for each pixel than a predetermined value by using defect information relative to the defective pixel, to obtain an image signal in which the pixel signal relative to the defective pixel is compensated, said method comprising:

using a compensation-signal generating unit to perform a compensation-signal-generating step of generating a compensation signal for each defective pixel based on the offset of the pixel signal relative to the defective pixel indicated by the defect information;

a first compensating step of compensating for the pixel signal relative to the defective pixel indicated by the defect information with applying the compensation signal to the pixel signal generated by the image pickup element;

a second compensating step of compensating for the pixel signal relative to the defective pixel indicated by the defect information without applying the compensation signal to the pixel signal generated by the image pickup element; and a compensation-switching step of switching between a first signal compensated in the first compensating step and a second signal compensated by the second compensating step based on a comparison result of a signal level of the compensation signal with a signal level of a predetermined compensation-switching reference signal and setting the switched signal as the image signal in which the pixel signal relative to the defective pixel is compensated, the compensation-switching step comprising setting the first signal as the image signal in which the pixel signal relative to the defective pixel is compensated when a signal level of the compensation signal does not exceed a signal level of the predetermined compensation-switching reference signal and setting the second signal as the image signal in which the pixel signal relative to the defective pixel is compensated when a signal level of the compensation signal exceeds a signal level of the predetermined compensation-switching reference signal.

* * * * *